US009336544B2

(12) United States Patent
Nakajima et al.

(10) Patent No.: US 9,336,544 B2
(45) Date of Patent: May 10, 2016

(54) ON-DEVICE OFFLINE PURCHASES USING CREDITS

(71) Applicant: Apple Inc., Cupertino, CA (US)

(72) Inventors: Taido Nakajima, Cupertino, CA (US); Tyler Mincey, Pacifica, CA (US); Gloria Lin, San Ramon, CA (US); Joey Darragh, Stanford, CA (US)

(73) Assignee: Apple Inc., Cupertino, CA (US)

( * ) Notice: Subject to any disclaimer, the term of this patent is extended or adjusted under 35 U.S.C. 154(b) by 541 days.

(21) Appl. No.: 13/769,106

(22) Filed: Feb. 15, 2013

(65) Prior Publication Data

US 2013/0166442 A1 Jun. 27, 2013

Related U.S. Application Data

(62) Division of application No. 12/689,754, filed on Jan. 19, 2010, now Pat. No. 8,417,575.

(51) Int. Cl.
    G06Q 30/06 (2012.01)
    G06Q 20/12 (2012.01)
    G06Q 30/08 (2012.01)

(52) U.S. Cl.
    CPC ............ *G06Q 30/06* (2013.01); *G06Q 20/1235* (2013.01); *G06Q 30/0607* (2013.01)

(58) Field of Classification Search
    CPC ................................ G06Q 30/06; G06Q 30/08
    USPC ................................................ 705/26.1, 27.1
    See application file for complete search history.

(56) References Cited

U.S. PATENT DOCUMENTS

| 2007/0136608 A1 | 6/2007 | Kirovski et al. |
| 2007/0239611 A1 | 10/2007 | Blum |
| 2008/0119162 A1 | 5/2008 | Sivalingam et al. |

FOREIGN PATENT DOCUMENTS

| WO | 2006005933 | 1/2006 |
| WO | 2008080431 | 7/2008 |

OTHER PUBLICATIONS

Apple adds movie downloads to iTunes Jobs also announces a sequel to AppleTV; [3 Edition], Matt Richtel and Brad Stone. International Herald Tribune. Paris: Jan. 17, 2008. p. 13, downloaded from ProQuestDirect on the Internet on Mar. 19, 2012, 3 pages.
Marlin, Big Bucks in Micropayments, Information Week, Apr. 19, 2005, Iss. 1035, p. 68, downloaded from ProQuestDirect on the Internet on Mar. 20, 2012, 6 pages.
Apple ClicknBuy, last updated Oct. 12, 2011, downloaded from ProQuestDirect on Mar. 19, 2012, 21 pages.

*Primary Examiner* — James Zurita
(74) *Attorney, Agent, or Firm* — Polsinelli LLP

(57) ABSTRACT

This is directed to providing offline purchasing of media items using an electronic device. One or more media items that are not part of a user's media library can be stored on an electronic device. When a user later wishes to play back one of the media items, but the device cannot connect to a communications network to provide payment information for purchasing the media items, the electronic device can use prepaid credits that were purchased and stored by the device when a communications network was available to complete the purchase. By using pre-paid credits, the media store can be assured that the user has sufficient funds for the media item purchase.

16 Claims, 11 Drawing Sheets

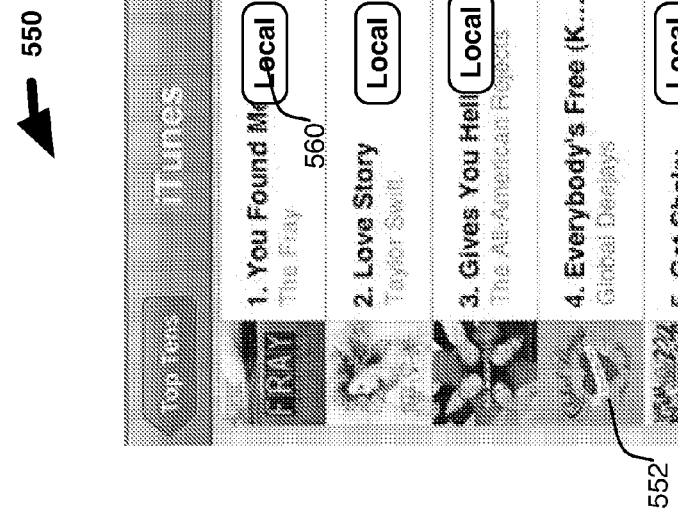
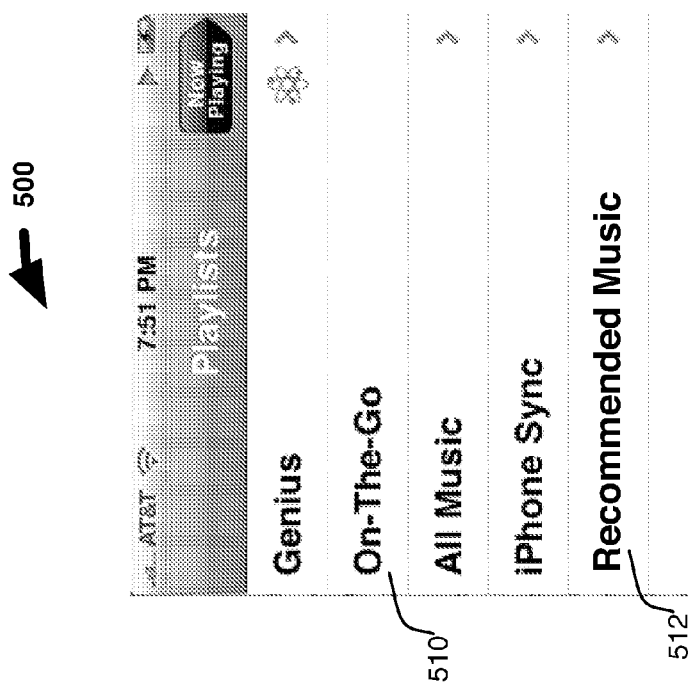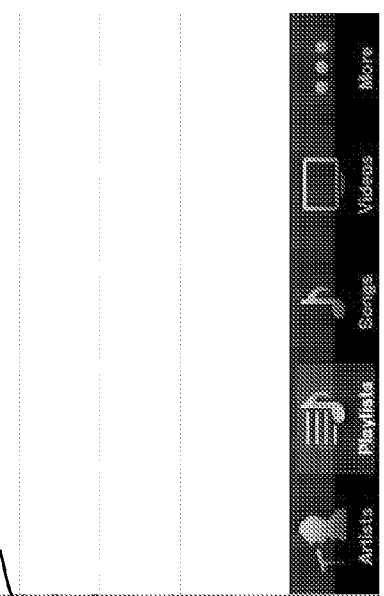
FIG. 5A
FIG. 5B

ON-DEVICE OFFLINE PURCHASES USING CREDITS

This application is a Divisional of and claims priority under 35 USC §120 U.S. patent application Ser. No. 12/689,754, filed Jan. 19, 2010, entitled "On-Device Offline Purchases Using Credits" which is hereby incorporated by reference herein in its entirety.

BACKGROUND OF THE INVENTION

This is directed to systems and methods for enabling users to purchase access to media items when a device is not connected to a remote source from which the media item can be remotely purchased and received. In particular, this is directed to locally storing media items that the user is not yet authorized to play back, and enabling the user to purchase and unlock the media items using prepaid credits stored on the device.

As portable electronic devices develop, users are able to access large amounts of media for playback using the portable devices. In some cases, the amount of storage available to some media devices has been surpassed by the size of media libraries owned by users. In addition, users can become more willing to expand their media libraries as the expanded libraries can be carried with them and consumed at will. Users can purchase access to additional or new media items using different approaches. In some cases, a user can direct an electronic device to connect to a remote server or content source from which media items can be purchased and downloaded for local storage. For example, a user can purchase media items using the iTunes store, available from Apple Inc. of Cupertino, Calif. In some cases, a user can instead or in addition direct an electronic device to connect to a remote source to stream media items. For example, a user can direct an electronic device to connect to a web-based media streaming system, such as one available from Pandora Media Inc., of Oakland, Calif.

Both of these approaches, however, require a connection to a remote source from which content can be received. In particular, a device may need to connect to a content source to download or stream a media item. When using a portable electronic device that does not include communications circuitry, or that is not coupled to a host device or other component having communications circuitry, a user may not be able to receive new media items using the device. Similarly, if no communications network is available to the device, or if the particular communications network available has insufficient capabilities (e.g., insufficient bandwidth), the device may not be able to receive a media item stream or download over the network.

In addition, a user may be required to purchase access to new media items. For example, a user may be required to subscribe to a media access plan (e.g., a monthly subscription allowing access but not ownership of media items), provide individual payments in exchange for access to each media item requested, or view or hear advertisements in exchange for access to media items (e.g., advertisements played back in between media items). If the device cannot communicate with a content source, the device may not be able to provide payment information or payment authorization to a content source to receive access to a media item. The user may then be prevented from accessing new media items while the electronic device is offline.

SUMMARY OF THE INVENTION

This is directed to systems and methods for performing offline transactions of media items. In particular, this is directed to locally storing media items that the user is not yet authorized to play back, and enabling the user to purchase and unlock the media items using prepaid credits stored on the device.

A user can store some or all of the media items from the user's media library (e.g., media items owned by the user) on a device for playback. In some cases, a user may wish to add new media items to the library, for example from an online media store. When the device is not connected to the store, however, the user may not be able to perform a transaction to purchase new media items, nor download or access the media items from the store. To enable offline purchases of media, the electronic device can store locally for future use one or more recommended media items received from the store when a connection with the store is available. Access to the recommended media items can be restricted, so that the user cannot consume the media items without first purchasing them.

To complete a media item purchase without sending transaction information to the media store, the electronic device can store pre-paid credits locally on the device. The pre-paid credits can be purchased in advance, for example when the device is connected to the store. In response to a user request to purchase a particular recommended media item, the electronic device can deduct the cost of the recommended media item from the locally stored credit, and remove the access restrictions of the device. The amount of credit remaining can be communicated to the store or to a host device (e.g., used to manage the user's media library) when communications become available.

The purchased recommended media item can be transferred to the user's media library at any suitable time. For example, the electronic device can provide a copy of the media item to the user's library. As another example, the host device can request and receive the media item from the store upon providing transaction information describing the on-device credit-based transaction. The electronic device can store any suitable amount of pre-paid credit, including for example a default or threshold amount. The purchases made using pre-paid credit can be associated with a user's account held by the media store when communications are re-established to ensure that the user's account remains accurate and up to date.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 5A is a schematic view of a playlist presentation of recommended media items in accordance with one embodiment of the invention.

FIG. 5B is a schematic view of an illustrative display of locally available media items from a store in accordance with one embodiment of the invention;

DETAILED DESCRIPTION

This is directed to enabling the purchase of media items without connecting to a media store.

A user can play back media items from any suitable source. In some embodiments, a user may own or have access to a particular subset of existing media items that form the user's library. The user can organize the media items of the library into one or more playlists, assign rankings or preferences to particular media items or to metadata values associated with one or more media item (e.g., album names or artists), define compilations of media items, or any other operation or combination of operation on the media items. The media library can be located on one or more different devices. For example, the media items of a user's media library can be stored on a particular device, along with an application for organizing and managing the media items and their playback. As another example, media items can be distributed in one or more remote locations (e.g., a remote server), where a particular user device is used to control the management and playback of the media items.

In some cases, a user can transfer or copy some or all of the media items from the user's library to a portable electronic device. For example, the electronic device can store media items from a particular playlist, artist, genre, mix, or combination of these. The electronic device can connect to the library using any suitable approach. For example, the electronic device can connect to one or more remote sources on which the media items are stored (e.g., wirelessly connect to a cloud). As another example, the electronic device can connect to a host device on which a library is stored using a cable (e.g., a wired path between the host device and electronic device for one or both of power and data transfers).

Figure 1:
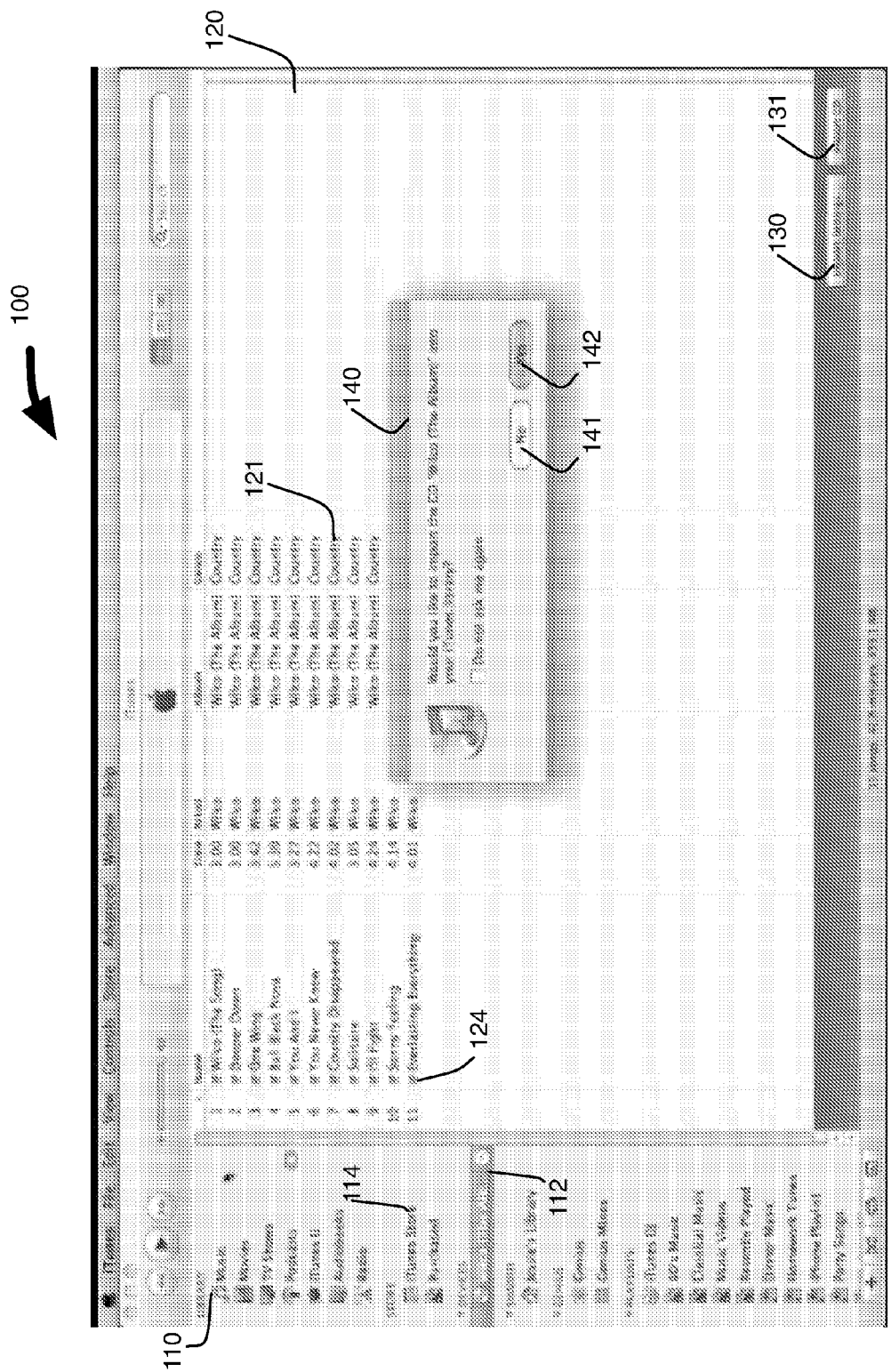
FIG. 1 is a schematic view of an illustrative interface for importing media from a disc to a media library in accordance with one embodiment of the invention.

A user can add media items to the library using different approaches. In some embodiments, a user can extract media items from different mediums or sources and incorporate the extracted media items in the user's library. For example, individual files of media items stored on a user's device or on a removable storage device (e.g., an external hard drive or thumb drive) can be imported into a user's library for management and playback control by a library application. As another example, media items encoded using a different CODEC or format can be imported from a disc storage medium. FIG. 1 is a schematic view of an illustrative interface for importing media from a disc to a media library in accordance with one embodiment of the invention. Display 100, which can be provided by an electronic device operating a media library management application, can include side bar 110 identifying different types of media available in the user's library, devices from which media items can be imported or streamed, playlists, and other options for selecting the types of media items to play back. A user can insert a disc storage medium (e.g., a CD, DVD, or Blue-Ray disc) from which the stored media items can be added to the user's media library. The particular disc storage medium can be identified in side bar 110, for example by option 112. In response to receiving a user selection of option 112, the application can display listing 122 of media items stored on the disc in region 120. Each listing 122 can identify a particular media item of the disc using any suitable approach, including for example by the title, artist name, album name, track length, and genre of the media item. Listing 122 can instead or in addition include any other suitable information for identifying media items, including for example composer, description, episode ID, season, show, size, track number, year, other metadata values, or combinations of these.

A user can select one or more of the media items of listing 122 to import from the disc to the media library. For example, a user can select media items using check boxes 124, or other approaches. Once the user has selected which media items to import, the user can define the import settings (e.g., the bitrate, encoding, container, and bit depth) for importing the media items using option 130, and direct the application to import the selected media items using option 131. In response to receiving a user selection of option 131, the application can display pop-up window 140 with options 141 and 142 for canceling or confirming the import of the media items. In some cases, the importing process can begin without displaying pop-up window 140 (e.g., if the user selects a check box for not being prompt again). The application can encode the imported media items (if necessary), and add them to the library. In particular, a user can retrieve the imported media items by selecting the library option in side bar 110. Although FIG. 1 specifically illustrates the example of importing media items from a disc, it will be understood that a similar interface and process can be used to import media items from other storage sources (e.g., hard drives of the electronic device operating the application, remote servers from which media items can be downloaded, such as Internet web sites with downloadable media items, or media items received by the user using a communications interface, such as in an email message).

In some embodiments, the library application can include an interface for interacting with a storefront of a media store from which media items can be purchased. In the following discussion, it will be understood that purchasing a media item or purchasing access to a media item are interchangeable, and incorporate all forms by which a user may remove restrictions on access to media items. For example, it will be understood that these terms encompass the purchase and downloading of a file that a user can store in a user's library, the purchase of access to a stream of the media item from a remote source, the purchase of a license to play back some or all of a media item, or combinations and variations of these.

Figure 2:
FIG. 2 is a schematic view of an illustrative interface for purchasing media items in accordance with one embodiment of the invention.

A user can access the storefront using any suitable approach, including for example by selecting store option 114 in side bar 110 (FIG. 1). In response to receiving a user instruction to access the storefront, the application can display an interface for allowing a user to search for and purchase media items. FIG. 2 is a schematic view of an illustrative interface for purchasing media items in accordance with one embodiment of the invention. Display 200 can include listing 210 of media items available for purchase. The user can access a particular listing 210 using any suitable approach, including for example by selecting an appropriate option from a home screen (e.g., album art representing top selling albums, a genre option, or a recommended items option), searching for media items in a search field, or combinations of these. Each media item of listing 210 can be identified using different metadata, including for example a track name, duration and popularity measure. In some embodiments, the media items of listing 210 can be related (e.g., as part of an album or by a same artist) such that shared information for the media items can be displayed in a single shared location (e.g., album information 220). Display 200 can include any suitable shared information, such as album art, album name, artist name, album year, album rating, or combinations of these.

A user can purchase a media item from listing 210 by providing a corresponding purchase instruction. For example, a user can select a purchase option 212 associated with each media item in listing 210. The purchase option can include any suitable information, including for example a price, option to gift the media item to another person, option for sharing the media item over a social network, or combinations of these. In response to receiving a selection of purchase option 212, the application can prompt the user to provide purchase or payment information. For example, the application can prompt the user to provide information for transferring funds (e.g., a credit card number, a bank account, or a payment processing account) to the media store. As another example, the application can prompt the user to authenticate and access a user account (e.g., from a username and password). The user account can include fund transfer information, or other information required to perform the transfer of funds necessary to allow access to a selected media item. Once a media item has been purchased (e.g., the transaction information has been verified and accepted), the media item can be added to the user's media library (e.g., downloaded and locally or remotely stored), or access can be provided for remotely streamed media items.

Figures 3A, 3B:
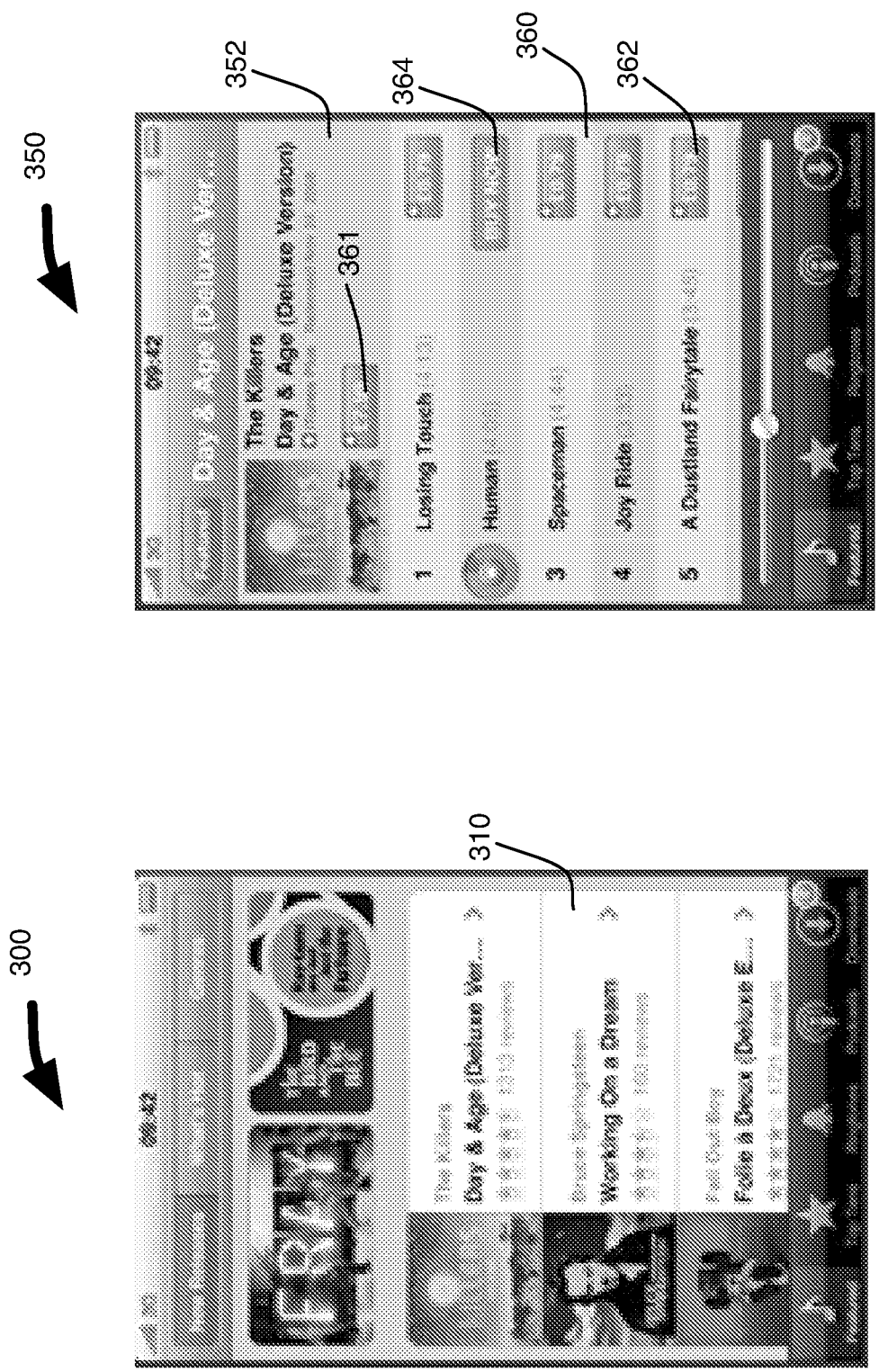
FIGS. 3A and 3B are schematic views of an illustrative display of an interface for mobile purchases of media items in accordance with one embodiment of the invention.

Although a user can purchase new media items using an application operating on a host device on which some or all of the user's media library is stored or from which some or all of the user's media items are accessed, a user may also be able to purchase media items wirelessly using an electronic device that is not directly connected to the user's media library. In particular, a user of a portable electronic device on which only a selected subset of a user's media library has been stored (e.g., via a cable-based transfer) can direct the portable electronic device to access a mobile version of a media store. FIGS. 3A and 3B are schematic views of an illustrative display of an interface for mobile purchases of media items in accordance with one embodiment of the invention. Display 300 can include listings 310 of collections of media items available for purchase. For example, listings 310 can identify different albums available for purchase (e.g., identified from album art, an artist, and an album name). A user can select a particular album listing to view the individual media items of a selected collection. Display 350 can be provided in response to receiving a user selection of one of listings 310. Display 350 can include information region 352 corresponding to the selected listing (e.g., the album art, album name and artist), as well as listings 360 of individual media items of the collection. A user can select to purchase access to the entire collection by selecting album purchase option 361, or individual media items by selecting item purchase option 362. Each of the purchase options can include a purchase price. In response to receiving a user selection of a purchase option, the application can change the appearance of the option to a confirmation option 364. Upon selecting the confirmation option, a user can be prompted to provide purchase information, similar to that described above in the context of FIG. 2. Once a media item has been purchased, the media item can be downloaded or streamed from a remote server and made available for playback by the device (e.g., locally stored). In some cases, a media item can be added to the user's media library. When the electronic device is later re-connected to a host device on which the user's library is stored, the purchased media item can be transferred from the electronic device (or from a remote server, such as the store that provided the media item to the electronic device) to the user's library.

Figure 4:
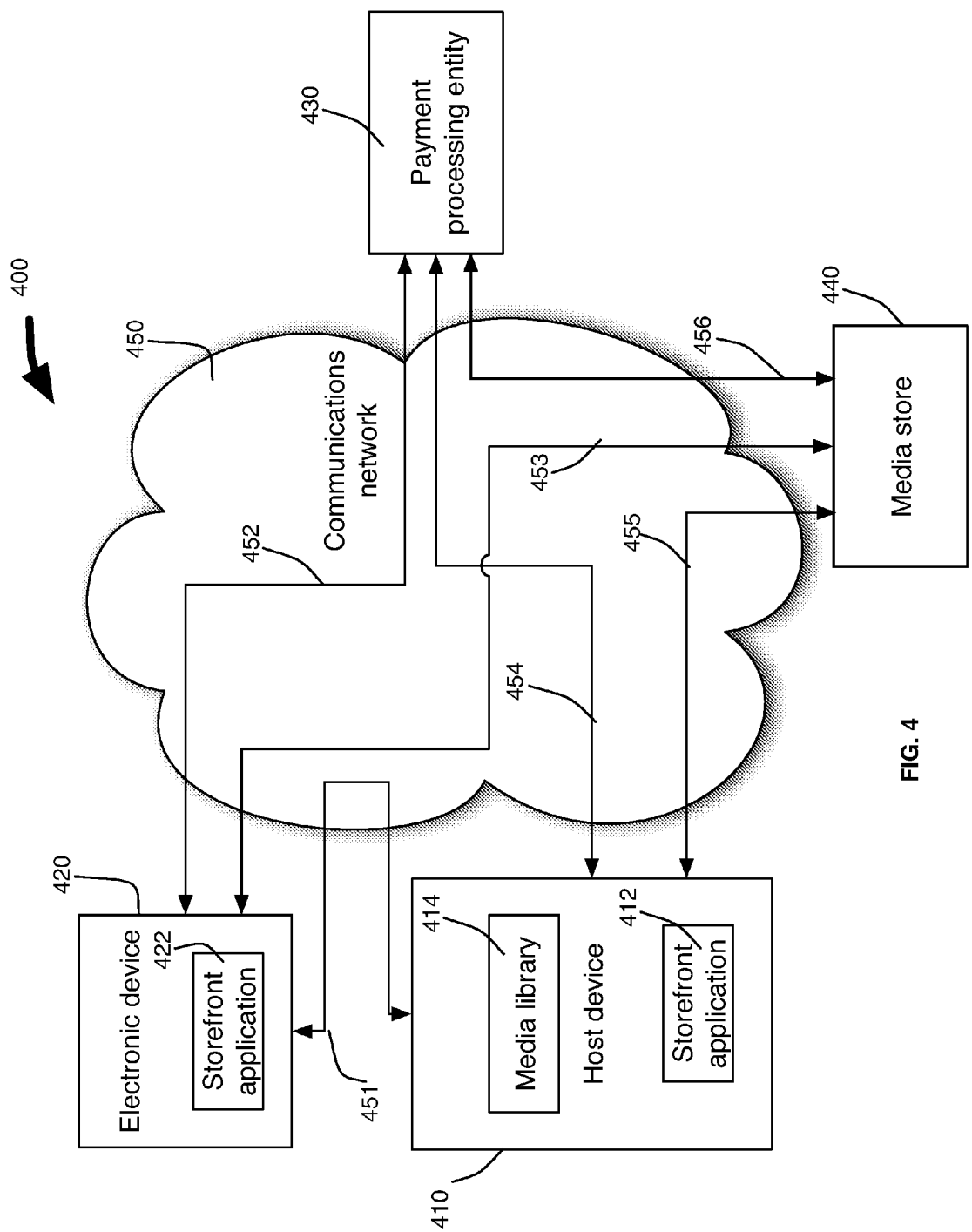
FIG. 4 is a schematic view of an illustrative system for processing a purchase request in accordance with one embodiment of the invention.

The application can ensure that a purchase option is properly funded using any suitable approach. In some embodiments, the application can establish a communications path with a payment processing entity or module that is distinct from the user's devices or the user's library. FIG. 4 is a schematic view of an illustrative system for processing a purchase request in accordance with one embodiment of the invention. System 400 can include host device 410, electronic device 420, and payment processing entity 430, and media store 440. Host device 410 and electronic device 420 can include a storefront application 412 and 422, respectively, from which the devices can access listings of media items available for purchase (e.g., displays 200 and 300 of FIGS. 2 and 3, respectively). Using the storefront applications, a user can select a particular media item for purchase, and provide purchase information to the storefront application. The purchase information can include any suitable information to enable the transfer of funds from the user to media store 440, in exchange for which the media store will provide access to a purchased media item. For example, the purchase information can include a credit card number, bank account information, wire transfer information, or any other information that can be used to transfer funds from one account to another. As another example, the purchase information can include login information for logging into an account with the media store or with a third-party payment processor, where the account includes fund transfer information enabling the transfer of funds to the media store.

The purchase information can be provided from devices 410 and 420 to payment processing entity 430 via communications paths 452 and 454, respectively, of communications network 450. Communications network 450 can include any suitable type of communications network suitable for carrying signals between the devices and the payment processing entity. In some cases, communications network 450 can include one or more of the networks described below as communications networks available to one or both of devices 410 and 420. In response to receiving the purchase information, payment processing entity 430 can verify the purchase information to ensure that the information corresponds to existing accounts from which funds can be transferred. For example, payment processing entity 430 can process credit card purchases to ensure that the issuing bank agrees to extend sufficient credit for the purchase. As another example, payment processing entity 430 can process a bank account number by requesting a funds transfer from the user's bank account to an account associated with media store 440. Payment processing entity 430, therefore, can include any suitable entity capable of receiving a purchase instruction and directing the transfer of funds to media store 440, such as, for example, a bank, a credit card processing service, or a combination of these.

Once payment processing entity 430 approves a transaction, the payment processing entity can provide a corresponding signal or communication to media store 430, for example over communications path 456. Media store 430 can then provide the purchased media item to host device 410, electronic device 420, or both via communication paths 453 and 455. In some embodiments, host device 410 and electronic device 420 can transfer media items to each other via communications path 451. In particular, media items purchased by electronic device 420 can be transferred to host device 410 for storage in media library 414. In some embodiments, media store 440 can instead or in addition provide host device 410 and electronic device 420 with licenses to access a media item from a remote source (e.g., license to stream). The media item itself may not be locally stored by the devices, but rather the licenses or codes providing access to the media items may be locally stored (e.g., in media library 414).

The approach described above, however, requires an active communications path between the user's device (e.g., host device 410 or electronic device 420) and payment processing entity 430 and media store 440. Without the communications path, a user may not be able to provide purchase information to the payment processing entity, which in turn would prevent the media store from enabling the playback of a purchased media item. When a user wishes to access a new media item using an electronic device that does not include any communications circuitry, or when the communications circuitry of the electronic device is unable to connect to a communications network, a user may not be able to purchase access to new media items. Instead, the user may be forced to wait until the device is connected to a communications network (e.g., via a host device having appropriate communications circuitry) to provide purchase information to a media store, and receive access (e.g., authorization to stream or a copy of the media item) to the media item.

To allow a user to purchase a media item without a communications network, the device must first retrieve a copy of a new media item to play back, and second receive authorization to play back the new media item. The electronic device can retrieve copies of media items that the user is not authorized to access using any suitable approach. In some embodiments, a host device having access to a media store can identify one or more media items of the media store that are not in the user's media library to recommend to the user. The recommended items can be selected based on any suitable criteria, including for example the media items of the user's library, recently played back media items, media item rankings, recently purchased or added media items, a preference profile defined by the user, or combinations of these. In some embodiments, the recommended media items can be selected based on playback or sale information provided by other users (e.g., the top selling media items in the media store, or the recently purchased media items by users in a local network). When the electronic device is connected to the host device, the host device can transfer the recommended media items to the electronic device for local storage.

To prevent the user from playing back the recommended media items without first purchasing access to them, the electronic device can define access restrictions for the recommended media items. Using the restrictions, a media store providing a media item can limit the operations that a user can perform with the media item, including ownership, transfer, playback, and quality limitations. For example, the electronic device can restrict the amount of the media item that is available for playback (e.g., only pay back 30 seconds of a song even though the entire song is locally stored). As another example, the electronic device can play back the media item at a lower quality (e.g., reduce the bitrate or bit depth of a recommended media item) until the media item is purchased.

As still another example, the electronic device can limit the number of times that the media item can be played back (e.g., allow the recommended media items to be played back only once or three times), or the manner in which the media item can be transferred (e.g., only allow the media item to be played back on the electronic device and not on a host device storing the user's media library). In some cases, two distinct files can be loaded to the electronic device for each media item, where one of the media files includes a restriction or limitation to the media item, and is the only file available until access is purchased. In some embodiments, combinations of these and other approaches can be used to reduce a user's access to a recommended media item.

The locally stored recommended media items can be presented to the user using any suitable approach. FIG. 5A is a schematic view of a playlist presentation of recommended media items in accordance with one embodiment of the invention. Display 500 can include listing 510 of playlists available for playback by the user. In some cases, listing 510 can include Recommended Music playlist 512 of media items recommended to the user but not yet owned by the user. In response to receiving a user selection of playlist 512, the electronic device can display a listing of the recommended media items, along with prices and options to purchase access to the media items (e.g., to remove the access restrictions on the media items). In some embodiments, the electronic device can instead or in addition play back one or more of the recommended media items in accordance with the access restrictions (e.g., only play back each restricted media item once). The purchase option can be provided using any suitable approach, including for example one or more of the approaches described above (e.g., in connection with FIGS. 2 and 3A and B).

FIG. 5B is a schematic view of an illustrative display of locally available media items from a store in accordance with one embodiment of the invention. Display 550 can include listing 552 of media items available for purchase from a media store. In particular, display 550 can include a listing accessed from a media store interface, where each media item of the listing is identified by one or more of album art, an album name, artist, and media item title. The listing corresponding to the media item can differ from other listings (e.g., font, font size, graphics, or order in the listings), for example by including indicator 560, to indicate to the user that a media item from the store has been locally stored and is available for purchase even when the device is not connected to the store. Indicator 560 can provide the indication using any suitable approach, including for example by incorporating text indicating the local storage of the media item. The user can then purchase a locally stored media item by selecting the corresponding purchase option 562 (described in more detail above).

Using this approach, therefore, an electronic device can locally store media items that a user may wish to purchase and to which the user may only have limited or restricted access. The electronic device, however, may still need to process payments provided by the user before removing restrictions on purchased media items. Because payments cannot be processed at the time of a purchase by connecting to the payment processing entity, payments can be made in advance, and a credit corresponding to pre-made payments can be stored on the device. For example, a user can purchase a particular amount of credit in advance using the host device, and transfer some or all of the credit to the electronic device. As another example, a user can direct the electronic device to purchase and store credits from the device when the device is able to connect to a communications network (and the user expects not to be able to connect to the communications network in the future, for example because the user will be entering a zone where there is no communications network). As still another example, a user can be pre-authorized to make purchases (e.g., using a credit card) up to a particular limit, such that the credit card transaction is processed after the purchase has been made, once the electronic device again connects to the communications network. Once the credit card transaction has been approved (e.g., after re-connecting to the network), the electronic device can reset the credit limit for addition offline purchases.

Figure 6:
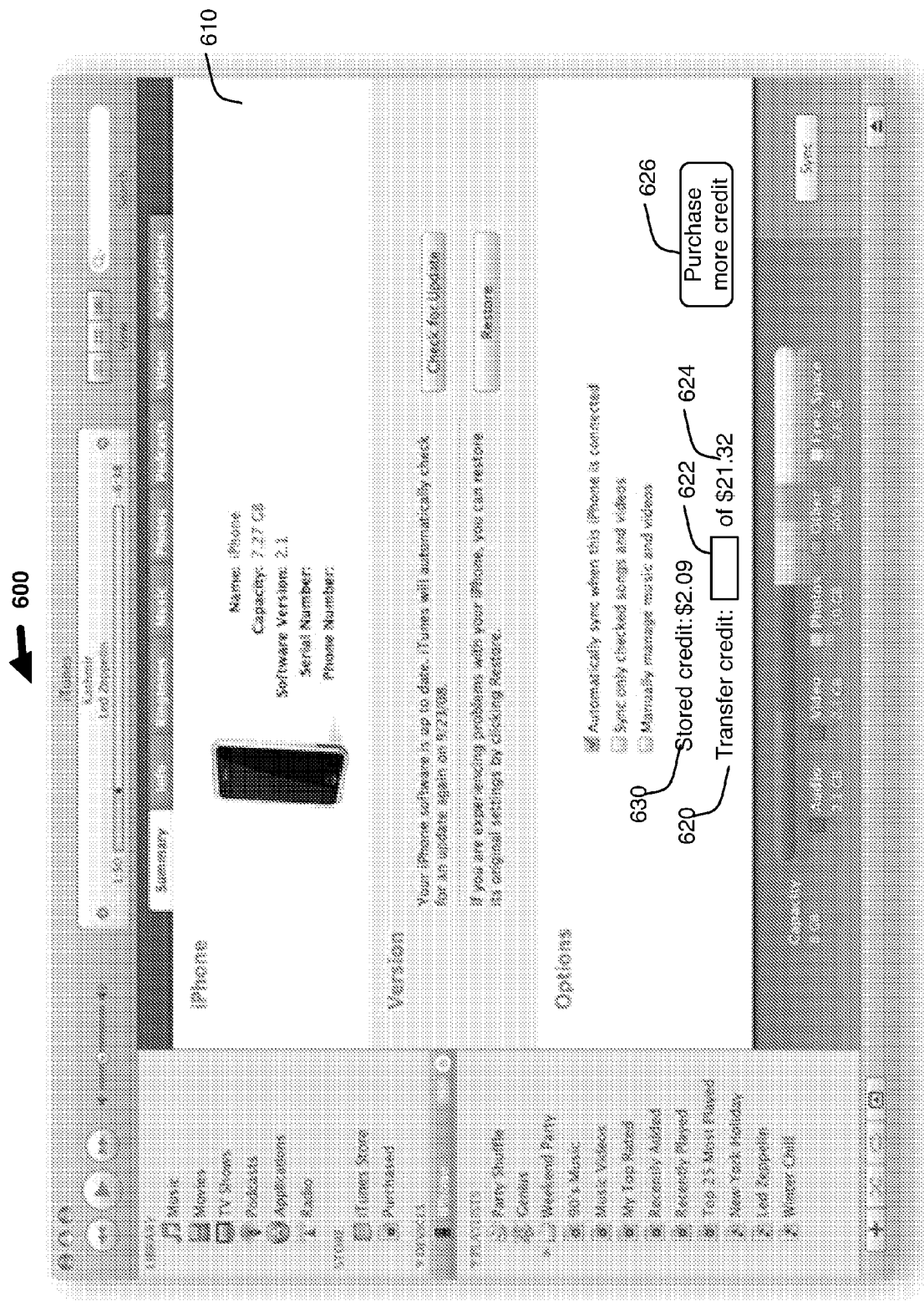
FIG. 6 is a schematic view of an illustrative display for transferring credit from a host device application to the electronic device using any suitable approach.

A user can direct an application to transfer credit to an electronic device using any suitable approach. FIG. 6 is a schematic view of an illustrative display for transferring credit from a host device application to the electronic device using any suitable approach. Display 600, which can be provided by a media management application, can include information region 610 describing settings of an electronic device connected to a host. Using the application, a user can define several settings and options for specifying the data provided to the electronic device. For example, the user can specify the communications and calendar accounts to provide to the device, the media items to store locally (e.g., how many recommended media items to provide), as well as application to load on the device. In some embodiments, region 610 can include option 620 for transferring credit from the user's account to the electronic device. Option 620 can include indication 624 of the total amount of credit available to the user, and text box 622 for defining how much credit to transfer to the device. If the user wishes to transfer more credit to the device than is initially available, the user can select option 626 for purchasing more credit. Alternatively or in addition, the application can prompt the user to purchase more credit when the user enters an amount in box 622 that exceeds indication 624.

In some cases, the electronic device can have an initial amount of credit previously stored, shown in region 610 by stored credit indicator 630. A user can transfer credit back to the application from the electronic device, for example by providing a negative number in box 622 or by selecting from a toggled sub-option in option 620 (e.g., toggle between "to the device" and "from the device"). This may be useful, for example, for transferring credits between several electronic devices owned by a user, where all of the devices are used to purchase media items using pre-purchased credits.

Figures 7, 8:
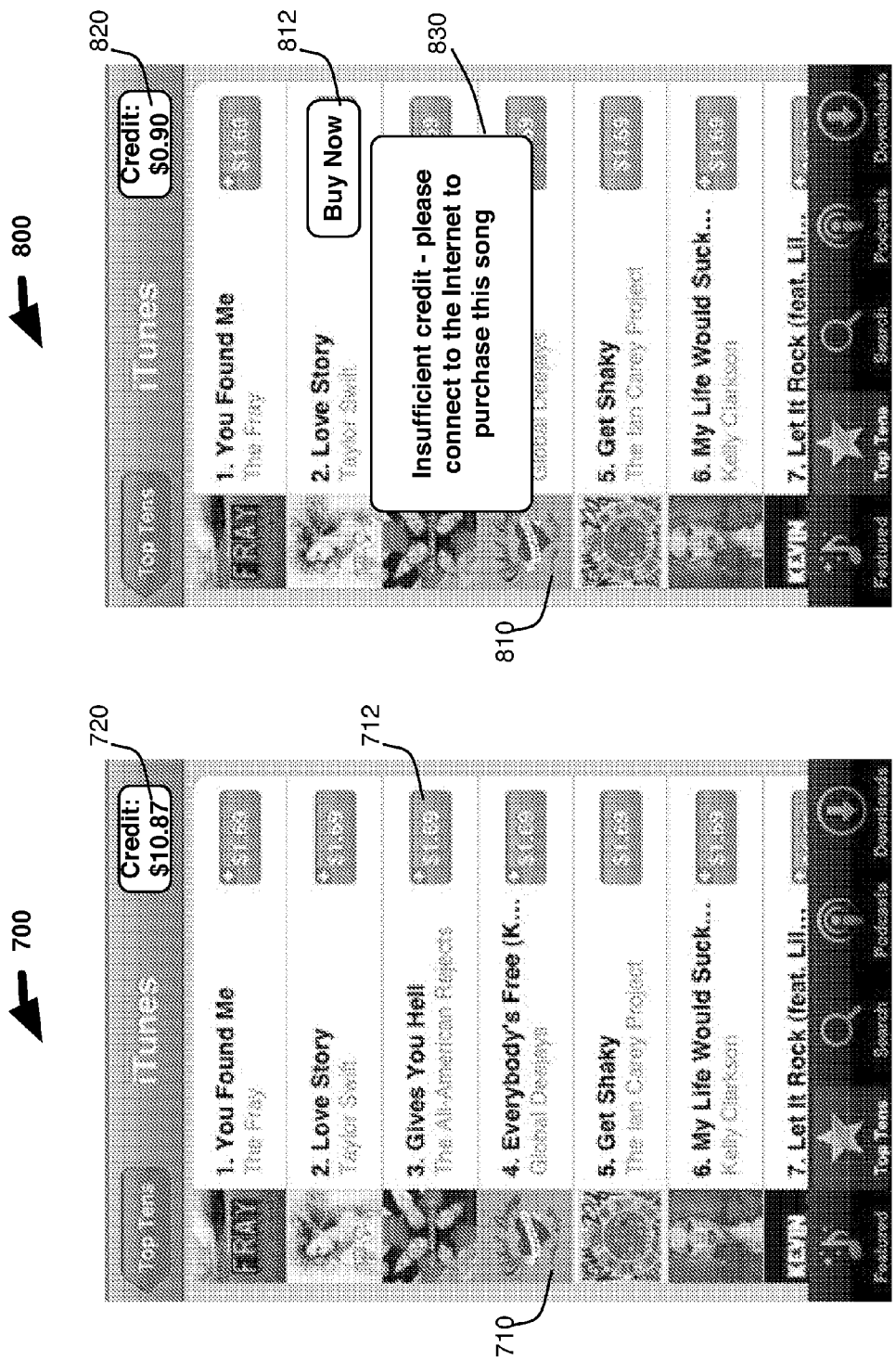
FIG. 7 is a schematic view of an illustrative display for purchasing media items using pre-purchased credits in accordance with one embodiment of the invention.
FIG. 8 is a schematic view of an illustrative display indicating to a user that additional credit is required in accordance with one embodiment of the invention.

On the device, a media store application can provide an indication of the amount of credit locally stored. FIG. 7 is a schematic view of an illustrative display for purchasing media items using pre-purchased credits in accordance with one embodiment of the invention. Display 700 can include listing 710 of media items available for purchase, along with options 712 for purchasing the particular media items. To enable a user to purchase media items when the device is offline, display 700 can include notice 720 indicating the amount of credit remaining on the device. As the user purchases media items, the amount of credit remaining on the device can decline until no credit is left. If a user wishes to purchase a media item for which insufficient credit is available, the electronic device can prompt the user to purchase additional credit, which will be purchased and added to the device when the device again reaches a communications network and can purchase the credit.

FIG. 8 is a schematic view of an illustrative display indicating to a user that additional credit is required in accordance with one embodiment of the invention. Display 800 can include listing 810 of media items available for purchase, for example corresponding to listing 710 (FIG. 7). In response to a user selection of a particular media item for purchase, the price option can be replaced with a confirmation option 812. In response to selecting the confirmation option, the electronic device can compare the amount of credit remaining on the device (e.g., identified in notice 820) with the credit required to purchase the media item (e.g., previously shown instead of confirmation option 812). If the electronic device has insufficient locally stored credit, the electronic device can prompt the user to purchase additional credit by connecting to a communications network. For example, display 800 can include pop-up window 830 directing the user to connect to a communications network to purchase additional credits. The user can direct the electronic device to purchase any amount of credit, including for example enough credit to purchase the one or more selected media items, one or more media items in which the user expressed interest, a user-defined amount, a default amount, or a combination of these.

In some embodiments, the electronic device can automatically ensure that a minimum amount of credit is locally stored to enable offline purchases. The minimum threshold can be defined using any suitable approach, including for example as a default amount or as a user-defined amount. In some embodiments, the electronic device can define a threshold credit based on the user's history of on-device media item purchases. For example, the electronic device can determine an average (e.g., mean or median) cost of purchases performed within a given time frame (e.g., between synchs with a host device, during intervals when no communications network is available, or in a single charging cycle), a maximum purchase amount (e.g., the most a user spent at a single time on media items), or combinations of these. The electronic device can purchase additional credits at any suitable time. For example, the electronic device can purchase additional credits directly from the media store when the device connects to a communications network. As another example, the electronic device can instead or in addition purchase additional credits via a host device when the electronic device is connected to the host device.

When a user purchases a media item using stored credits, the electronic device can remove prior restrictions on access to the media item. For example, the electronic device can enable playback of the entire media item (not just 30 seconds), a high quality version of the media item (e.g., higher bit rate, bit depth, or both), flag the media item as an asset that belongs to the user's media library, or combinations of these. To include the purchased media item in the user's media library, the electronic device can transfer the media items from the device to the host device on which the library is stored when the electronic device and host device are connected. In some embodiments, the electronic device can instead or in addition identify the purchased media item to the host device, and the host device can retrieve the media item from a remote source (e.g., the media store). If the media items of the user's library are stored remotely, the purchased media item can be added to the remote storage, or the media library can receive a license authorizing access to the purchased media item from a remote source (e.g., in a cloud-type system where media items not available to the user are in the cloud with the user's media library). The electronic device can also identify the purchased media item to the media library, the media store, or both to ensure that accurate records describing a user's purchasing history are kept.

In some embodiments, a user can have several accounts or libraries. Alternatively, several users each having different libraries can use a same electronic device to purchase media items. To ensure that a purchased item is later incorporated in the correct media library, the electronic device can require a username and password or other identification information from which a particular media library can be selected. The authentication information can be provided at any suitable time, for example upon starting to use the device (e.g., as a login screen), when providing the purchase information (e.g., a credit card number associated with a name to which a media library corresponds), or combinations of these.

Figure 9:
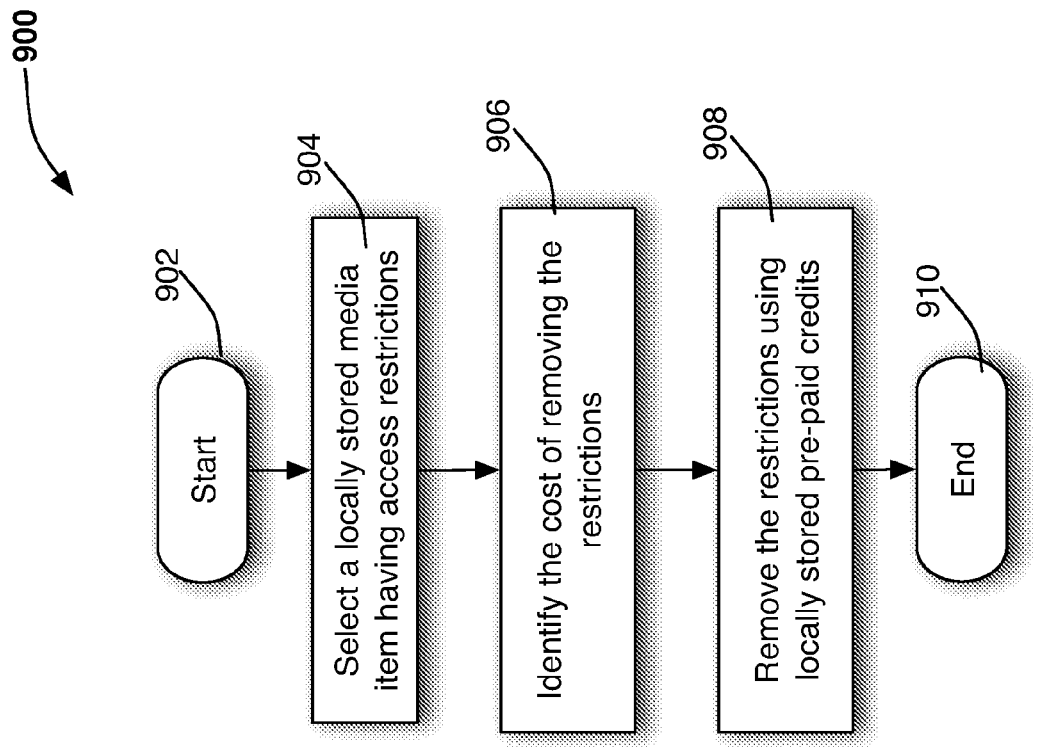
FIG. 9 is a flowchart of an illustrative process for removing restrictions to a media item while not connected to a communications network.

FIG. 9 is a flowchart of an illustrative process for removing restrictions to a media item while not connected to a communications network. Process 900 can begin at step 902. At step 904, a user can select a locally stored media item having access restrictions. For example, a user can select a media item retrieved from a host device that is not part of the user's media library, and from which only a segment can be played back. At step 906, the electronic device can determine the cost of removing the restrictions to the stored media item. For example, the electronic device can determine the cost of purchasing the media item (e.g., to download and add to the user's media library). At step 908, the electronic device can remove the restrictions using locally stored and pre-paid credits. For example, the electronic device can reduce the quantity of pre-paid credits stored on the device by the identified cost of removing the restrictions, and enable standard playback of the media item. In some embodiments, the electronic device can instead or in addition enable enhanced playback (e.g., at a higher quality, with more metadata provided, such as lyrics), instead of standard playback. Process 900 can then end at step 910.

Figure 10:
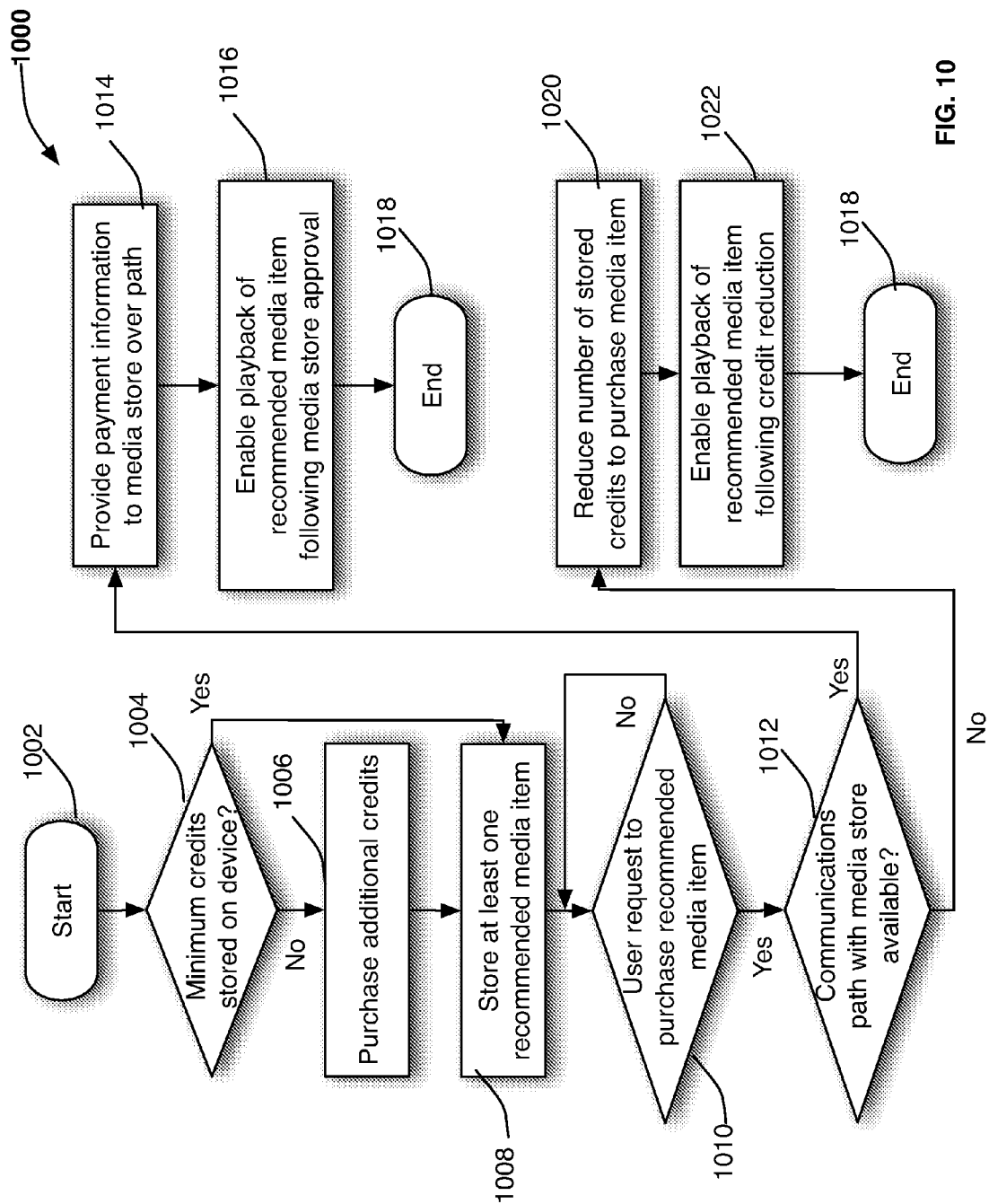
FIG. 10 is a flowchart of an illustrative process for purchasing media items using pre-paid credits in accordance with one embodiment of the invention.

FIG. 10 is a flowchart of an illustrative process for purchasing media items using pre-paid credits in accordance with one embodiment of the invention. Process 1000 can begin at step 1002. At step 1004, the electronic device can determine whether a minimum number of credits are stored on the device. For example, the electronic device can determine whether the amount of pre-paid credit available for purchasing media items exceeds a minimum threshold. If the electronic device determines that the minimum amount of credits are not stored on the device, process 1000 can move to step 1006. At step 1006, the electronic device can purchase additional credits. For example, the electronic device can purchase additional credits directly from a media store via a communications path. As another example, the electronic device can receive credits from a host device connected to the media store, where the host device purchases the credits. Process 1000 can then move to step 1008.

If, at step 1004, the electronic device instead or in addition determines that sufficient credits are stored on the device, process 1000 can move to step 1008. At step 1008, the electronic device can store at least one recommended media item that is not part of the user's library. For example, a host device can provide at least one recommended media item to the electronic device, such that access to the recommended media items is restricted. Access can be restricted in any suitable manner, including for example by restricting the playback length or duration of media items, the number of times a media item can be played back, transfers of media items to other devices, or combinations of these. At step 1010, the electronic device can determine whether a user request to purchase a recommended media item was received. For example, the electronic device can determine whether a user selected a displayed option for purchasing a recommended media item (e.g., to remove the access restrictions). If no request was received, process 1000 can return to step 1010 and continue to monitor for user requests to purchase recommended media items. If, at step 1010, the electronic device instead determines that the user provided a request to remove the restrictions of a recommended media item, process 1000 can move to step 1012.

At step 1012, the electronic device can determine whether a communications path with the media store providing the recommended media item is available. For example, the electronic device can determine whether communications circuitry, if available, is connected to a communications network supporting transactions between the electronic device and the media store. In some embodiments, the electronic device can instead or in addition determine whether a communications path is available with a payment processing module or entity, where the payment processing module enables transactions between the electronic device and the media store. If the electronic device determines that an adequate communications path is available, process 1000 can move to step 1014. At step 1014, the electronic device can provide payment or purchase information to the media store over the communications path. For example, the electronic device can provide user login information, bank account information, a credit card number, or other information for performing a transaction. At step 1016, the electronic device can enable playback of the requested recommended media item following the media store approval of the payment information. For example, the electronic device can remove restrictions on access to the media item in response to receiving a payment confirmation over the communications path (e.g., from the media store or from a payment processing module). Process 1000 can then end at step 1018.

If, at step 1012, the electronic device instead determines that no communications path is available with the media store, process 1000 can move to step 1020. At step 1020, the electronic device can reduce the number of stored credits by an amount required to purchase the requested recommended media item. For example, the electronic device can determine the cost of the media item, and deduct the cost from the stored credits. If the electronic device includes too few stored credits, the electronic device can direct the user to connect to the media store to purchase additional credits or to complete the transaction. At step 1022, the electronic device can enable access to the requested recommended media item following the deduction of the stored credits. For example, the electronic device can remove restrictions on access to the media item in response to receiving a payment confirmation over the communications path (e.g., from the media store or from a payment processing module). The updated amount of stored credits can be provided to a host device or to the media store at a later time, for example when a communications path becomes available. Process 1000 can then end at step 1018.

Figure 11:
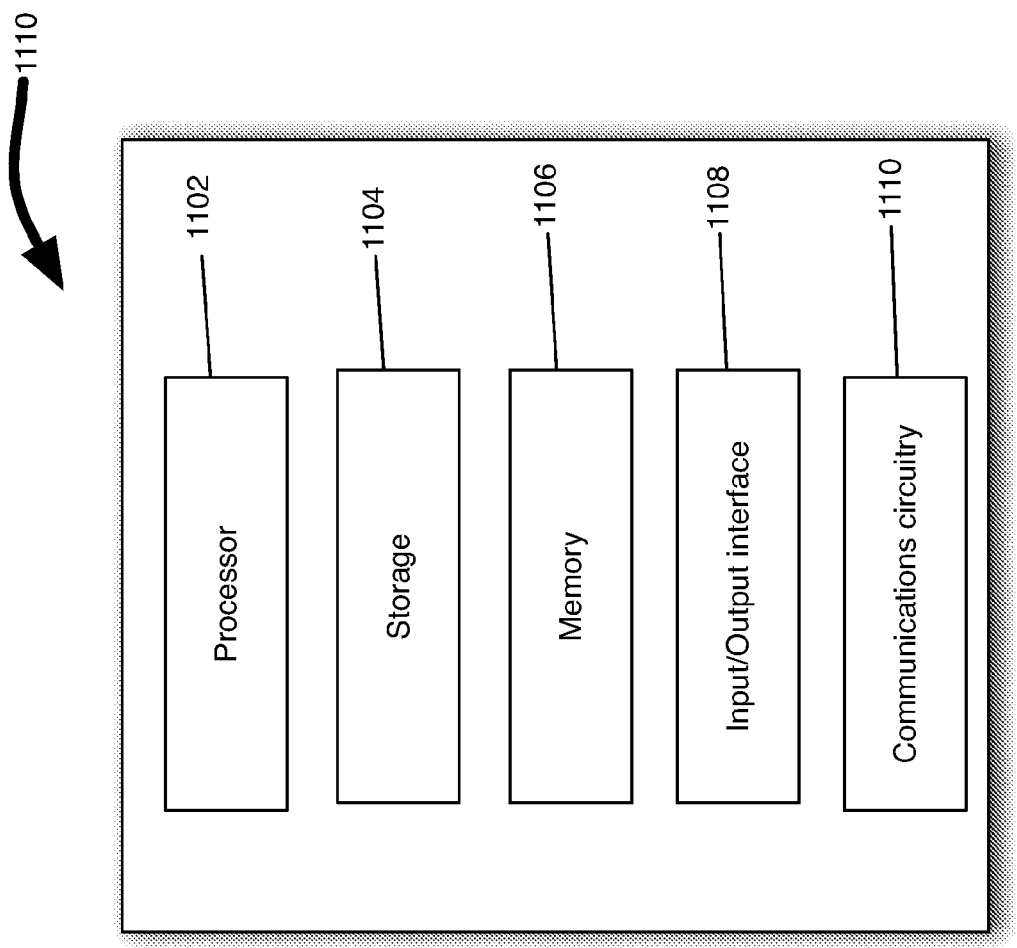
FIG. 11 is a schematic view of an illustrative electronic device for playing back media in accordance with one embodiment of the invention.

The electronic device and host device can include any suitable combination of hardware, firmware and software for performing offline transactions. FIG. 11 is a schematic view of an illustrative electronic device for playing back media in accordance with one embodiment of the invention. Electronic device 1100 can include any suitable type of electronic device operative to play back media items. For example, electronic device 1100 can include a media player such as an iPod® available by Apple Inc., of Cupertino, Calif., a cellular telephone, a personal e-mail or messaging device (e.g., a Blackberry® or a Sidekick®), an iPhone® available from Apple Inc., pocket-sized personal computers, personal digital assistants (PDAs), a laptop computer, a desktop computer, a music recorder, a video recorder, a camera, radios, medical equipment, and any other device capable of playing back media items.

Electronic device 1100 can include a processor or control circuitry 1102, storage 1104, memory 1106 input/output interface 1108, and communications circuitry 1110, as typically found in an electronic device of the type of electronic device 1100, and operative to enable any of the uses expected from an electronic device of the type of electronic device 1100 (e.g., connect to a host device for power or data transfers). In some embodiments, one or more of electronic device components 1100 can be combined or omitted (e.g., combine storage 1104 and memory 1106, or remove communications circuitry 1110), or electronic device 1100 can include other components not combined or included in those shown in FIG. 11 (e.g., motion detection circuitry), or several instances of the components shown in FIG. 11. For the sake of simplicity, only one of each of the components is shown in FIG. 11.

Processor 1102 may include any processing circuitry operative to control the operations and performance of electronic device 1100. For example, processor 1102 may be used to run operating system applications, firmware applications, media playback applications, media editing applications, or any other application. In some embodiments, a processor may drive a display and process inputs received from a user interface.

Storage 1104 may include, for example, one or more storage mediums including a hard-drive, solid state drive, flash memory, permanent memory such as ROM, any other suitable type of storage component, or any combination thereof. Storage 1104 may store, for example, media, application data, firmware, user preference information authentication information, lifestyle, exercise, transaction, wireless connection, subscription, contact, or calendar information, and any other suitable data or any combination thereof. Memory 1106 can include cache memory, semi-permanent memory such as RAM, and/or one or more different types of memory used for temporarily storing data. In some embodiments, memory 1106 can also be used for storing data used to operate electronic device applications, or any other type of data that may be stored in storage 1104. In some embodiments, memory 1106 and storage 1104 may be combined as a single storage medium.

Input/output interface 1108 can convert (and encode/decode, if necessary) analog signals and other signals into digital data. For example, input/output interface 1108 may receive and convert physical contact inputs (e.g., from a multi-touch screen or a button press), physical movements (e.g., from a mouse or sensor), analog audio signals (e.g., from a microphone), or any other input provided by a user. Although input/output interface 1108 is illustrated in FIG. 11 as a single component of electronic device 1100, several instances of input/output interface can be included in electronic device 1100.

Electronic device 1100 can include any suitable mechanism, circuitry or component for allowing a user to provide inputs to input/output interface 1108. For example, electronic device 1100 may include a button, keypad, dial, a click wheel, or a touch interface (e.g., a capacitive touch screen), or combination of these. Electronic device 1100 can include specialized output interface associated with output signals such as, for example, one or more audio or visual outputs. An audio output may include one or more speakers (e.g., mono or stereo speakers) built into electronic device 1100, or an audio component that is remotely coupled to electronic device 1100 (e.g., a headset, headphones or earbuds that may be coupled to communications device with a wire or wirelessly). A visual output can include display circuitry (e.g., a screen or projection system) for providing a display visible to the user. For example, the display circuitry can include a screen (e.g., an LCD screen) that is incorporated in electronics device 1100, a movable display or a projecting system for providing a display of content on a surface remote from electronic device 1100 (e.g., a video projector), or combinations of these. In some embodiments, input/output interface 1108 can include a coder/decoder (Codec) to convert digital media data into analog signals such as, for example, video Codecs, audio Codecs, or any other suitable type of Codec.

Communications circuitry 1110 can enable electronic device 1100 to communicate with other devices or with one or more servers using any suitable communications protocol. Electronic device 1100 can include one more instances of communications circuitry for simultaneously performing several communications operations using different communications networks. For example, communications circuitry may support Wi-Fi (e.g., a 802.11 protocol), Ethernet, Bluetooth™ (which is a trademark owned by Bluetooth Sig, Inc.), radio frequency systems, cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, FTP, RTP, RTSP, SSH, Voice over IP (VOIP), any other communications protocol, or any combination thereof. In some embodiments, communications circuitry 1110 may include one or more communications ports operative to provide a wired communications link between electronic device 1100 and a host device. For example, a portable electronic device may include one or more connectors (e.g., 30 pin connectors or USB connectors) operative to receive a cable coupling the portable electronic device to a host computer. Using software on the host computer (e.g. iTunes available from Apple Inc.), the portable electronic device may communicate with the host computer.

In some embodiments, electronic device 1100 may include a bus operative to provide a data transfer path for transferring data to, from, or between control processor 1102, storage 1104, memory 1106, input/output interface 1108, communications circuitry 1110, and any other component included in the electronic device.

Figure 12:
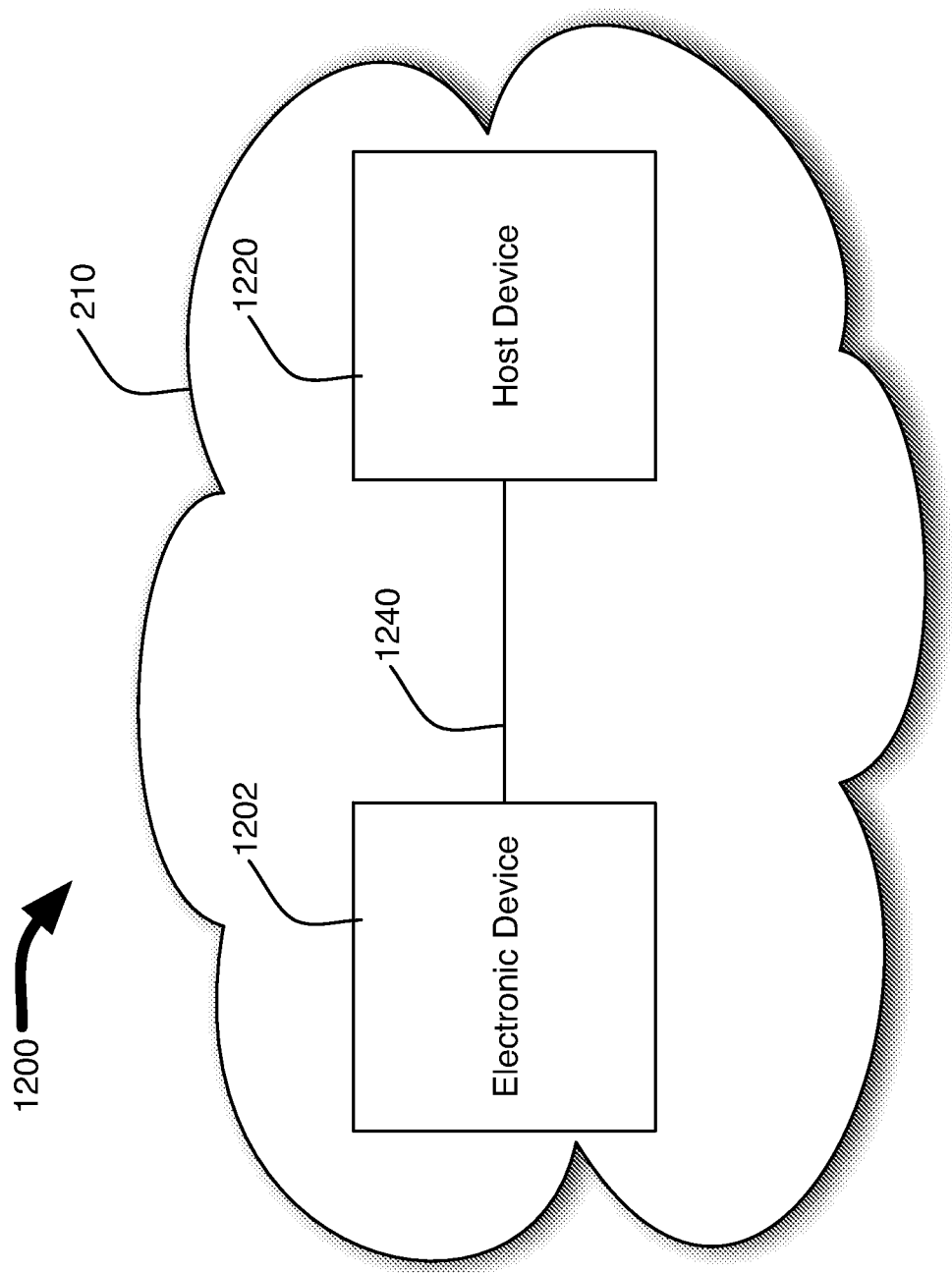
FIG. 12 is a schematic view of an illustrative communications system including an electronic device and a host device in accordance with one embodiment of the invention.

The electronic device can store some or all of a user's media library. For example, the entirety of the user's media library can be located in storage 1104. Alternatively, the user's media library can be hosted by another device, and particular media items of the user's library synched to the electronic device. FIG. 12 is a schematic view of an illustrative communications system including an electronic device and a host device in accordance with one embodiment of the invention. Communications system 1200 may include electronic device 1202 and communications network 1210, which electronic device 1202 may use to perform wired or wireless communications with other devices within communications network 1210. For example, electronic device 1202 may perform communications operations with host device 1220 over communications network 1210. Although communications system 1200 may include several electronic devices 1202 and host devices 1220, only one of each is shown in FIG. 12 to avoid overcomplicating the drawing.

Any suitable circuitry, device, system or combination of these (e.g., a wireless communications infrastructure including communications towers and telecommunications servers) operative to create a communications network may be used to create communications network 1210. Communications network 1210 may be capable of providing wireless communications using any suitable short-range or long-range communications protocol. In some embodiments, communications network 1210 may support, for example, Wi-Fi (e.g., a 802.11 protocol), Bluetooth (registered trademark), radio frequency systems (e.g., 1200 MHz, 2.4 GHz, and 5.6 GHz communication systems), infrared, protocols used by wireless and cellular phones and personal email devices, or any other protocol supporting wireless communications between electronic device 1202 and host device 1220. Communications network 1210 may instead or in addition be capable of providing wired communications between electronic device 1202 and host device 1220, for example using any suitable port on one or both of the devices (e.g., 30-pin, USB, FireWire, Serial, or Ethernet).

Electronic device 1202 may include any suitable device for receiving media or data. For example, electronic device 1202 may include one or more features of electronic device 1100 (FIG. 11). Electronic device 1202 may be coupled with host device 1220 over communications link 1240 using any suitable approach. For example, electronic device 1202 may use any suitable wireless communications protocol to connect to host device 1220 over communications link 1240. As another example, communications link 1240 may be a wired link that is coupled to both electronic device 1202 and media provider 1220 (e.g., an Ethernet cable). As still another example, communications link 1240 may include a combination of wired and wireless links (e.g., an accessory device for wirelessly communicating with host device 1220 may be coupled to electronic device 1202). In some embodiments, any suitable connector, dongle or docking station may be used to couple electronic device 1202 and host device 1220 as part of communications link 1240.

Host device 1220 may include any suitable type of device operative to host a media library and provide media files to electronic device 1202. For example, host device 1220 may include a computer (e.g., a desktop or laptop computer), a server (e.g., a server available over the Internet or using a dedicated communications link), a kiosk, or a combination of these (e.g., a computer having a listing of media items available in the user's library, and connected to a remote server on which the media items are stored). Host device 1220 may transfer media files of a media library to an electronic device using any suitable approach. In some embodiments, the host device can run an application dedicated to providing a communications interface between the host device and the electronic device (e.g., iTunes, available from Apple Inc.). Using the application, a user can define the particular subset of media items from the user's media library to transfer to the electronic device.

Although many of the embodiments of the present invention are described herein with respect to personal computing devices, it should be understood that the present invention is not limited to personal computing applications, but is generally applicable to other applications. In particular, embodiments of this invention are not limited to media items, but can apply to any content that a user can purchase while connected to a communications network, such as applications that operate on the electronic device, tickets to events or activities, fund transfers between two or more devices, or combinations of these. Using embodiments of this invention, such operations can be conducted while offline from the communications network.

Embodiments of the invention can be preferably implemented by software, but can also be implemented in hardware, firmware, software or a combination thereof. Embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

We claim:

1. A system for transferring credit to an electronic device for offline transactions, comprising:
    an electronic device comprising communications circuitry and control circuitry, the control circuitry operative to:
    direct the communications circuitry to purchase credits from a payment processing module operative to charge a payment amount to a user's account while communications between the electronic device and the payment processing module are available, wherein the credits are locally stored on the device;
    store at least one media item provided by a media store, wherein access to the media item is restricted until a fee is paid;
    receive a request to purchase access to the at least one media item;
    deduct the fee from the locally stored credits in response to receiving the request to purchase access to the at least one media item while the electronic device is offline; and
    remove the access restriction in response to deducting the fee.

2. The system of claim 1, wherein the control circuitry is further operative to:
    determine that the amount of locally stored credits is less than the fee; and
    prevent the removal of the access restriction of the at least one media item.

3. The system of claim 2, wherein the access restrictions comprise at least one of:
    the playback duration of the at least one media item;
    the number of times the at least one media item can be played back;
    the playback quality of the at least one media item; and
    transfers of the at least one media item to other devices.

4. The system of claim 1, further comprising:
    a payment processing module operative to:
    receive payment information from an electronic device, wherein the payment information identifies an account of a user of the electronic device; and
    transfer money from the account of the user of the electronic device to an account of the media store in exchange for credits from the media store.

5. The system of claim 1, further comprising:
    a host device comprising storage and a communications port, the storage storing media items of a media library; and
    wherein the control circuitry is further operative to:
    detect that the electronic device is connected to the communications port of the host device; and
    transfer the at least one media item to the host device for inclusion in the media library.

6. The system of claim 5, wherein the host device is operative to:
    connect to the payment processing module to purchase credits; and transfer at least some of the purchased credits to the electronic device via the communications port.

7. A non-transitory computer-readable storage medium including instructions stored thereon effective to cause a computing device to perform a process for transferring credit to an electronic device for offline transactions, comprising:
   direct the computing device to purchase credits from a payment processor operative to charge a payment amount to a user's account while communications between the computing device and the payment processing module are available, wherein the credits are locally stored on the computing device;
   store a media item provided by a media store, wherein access to at least a portion of the media item is restricted until a fee is paid;
   receive a request to access to the at least the portion of the media item;
   deduct the fee from the locally stored credits in response to receiving the request to purchase access to the at least the portion of the media item; and
   remove the access restriction in response to deducting the fee.

8. The non-transitory computer-readable storage medium of claim 7, wherein the instructions further cause the computing device to:
   determine the amount of locally stored credits is less than the fee; and
   prevent the removal of the access restriction of the at least one media items.

9. The non-transitory computer-readable storage medium of claim 7, wherein the instructions further cause the computing device to:
   determine a communications path between a host device and a payment processor is available;
   direct a host device, via the payment processor, to purchase additional credits; and
   direct the host device to transfer at least some of the purchased additional credits to the computing device.

10. The non-transitory computer-readable storage medium of claim 7, wherein the instructions further cause the computing device to:
    determine a communications path between the computing device and the media store is available;
    determine that the amount of locally stored credits is less than a minimum threshold; and
    purchase additional credits from the media store to reach at least the minimum threshold via the communications path.

11. The non-transitory computer readable storage medium of claim 10, wherein the minimum threshold is based on an average of the user's history of on-device media item purchases.

12. A method comprising:
    determining a communications between a computing device and a payment processing processor are available;
    purchasing credits from a payment processor operative to charge a payment amount to a user's account;
    storing the purchased credits locally on the computing device;
    storing a media item provided by a media store, wherein access to at least a portion of the media item is restricted until a fee is paid;
    receiving a request to access to the at least the portion of the media item;
    deducting the fee from the locally stored credits on the computing device in response to receiving the request to purchase access to the at least the portion of the media item; and
    removing the access restriction in response to deducting the fee.

13. The method of claim 12, further comprising:
    determining a suitable communications path between a host device and a payment processor is available;
    directing a host device, via the payment processor, to purchase additional credits; and
    directing the host device to transfer at least some of the purchased additional credits to the computing device.

14. The method of claim 12, further comprising:
    determining a communications path between the computing device and the media store is available;
    determining that the amount of stored purchased credits is less than a minimum threshold; and
    purchasing additional credits from the media store to reach at least the minimum threshold via the communications path.

15. The method of claim 14, wherein the minimum threshold is based on an average of the user's history of on-device media item purchases.

16. The method of claim 12 further comprising:
    determining the amount of locally stored credits is less than the fee; and
    preventing the removal of the access restriction of the at least one media items.

* * * * *